Sept. 10, 1946.    O. R. MILLER    2,407.320
ELECTRONIC COUNTER
Filed Nov. 5, 1942    9 Sheets-Sheet 1
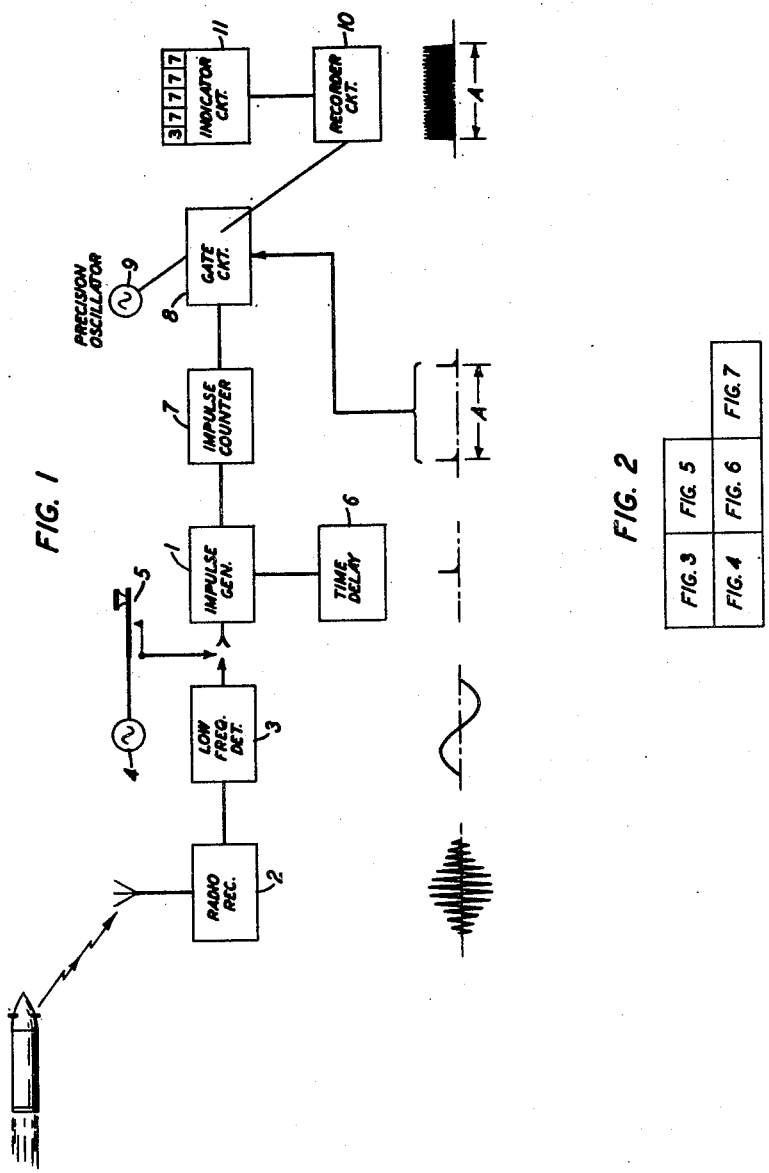
INVENTOR
O. R. MILLER
BY
ATTORNEY

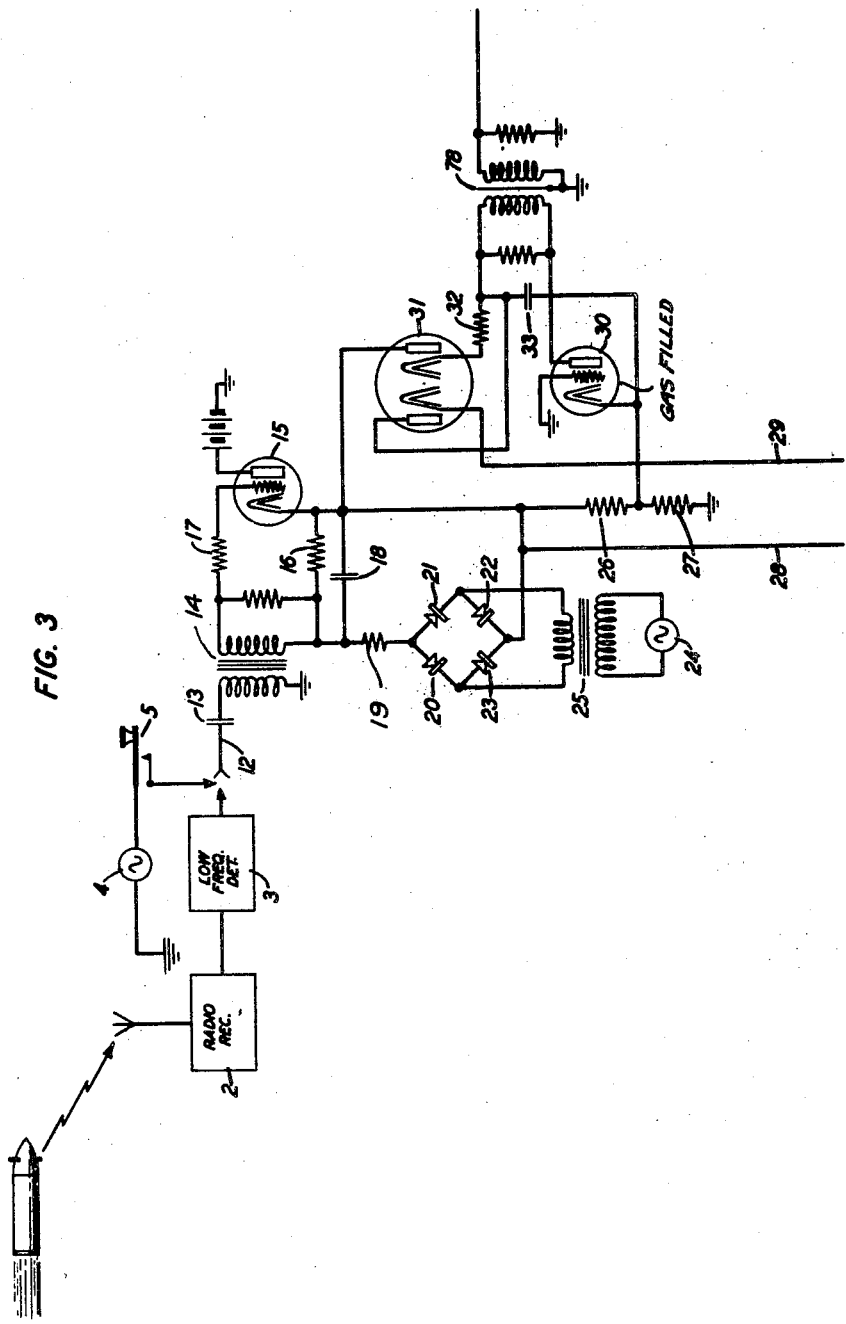

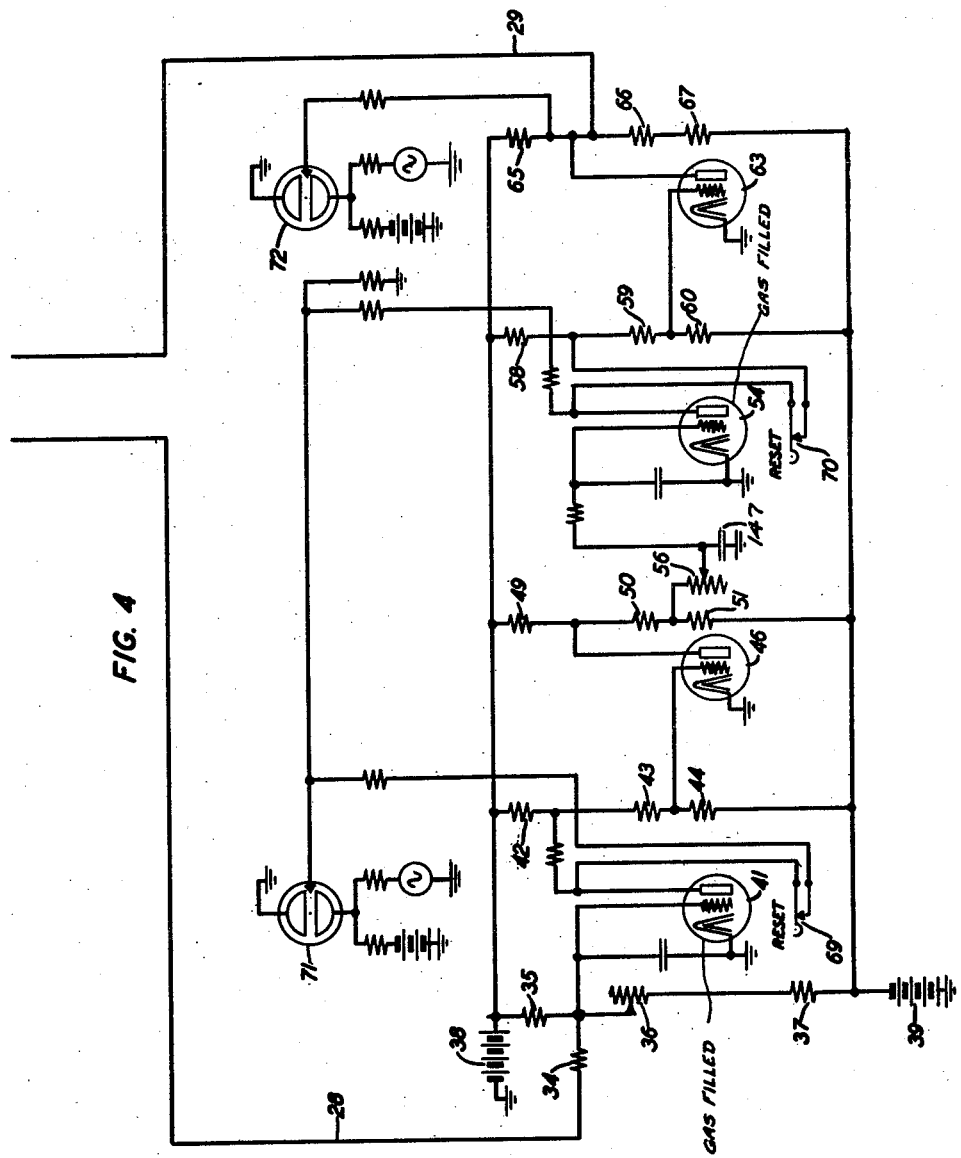

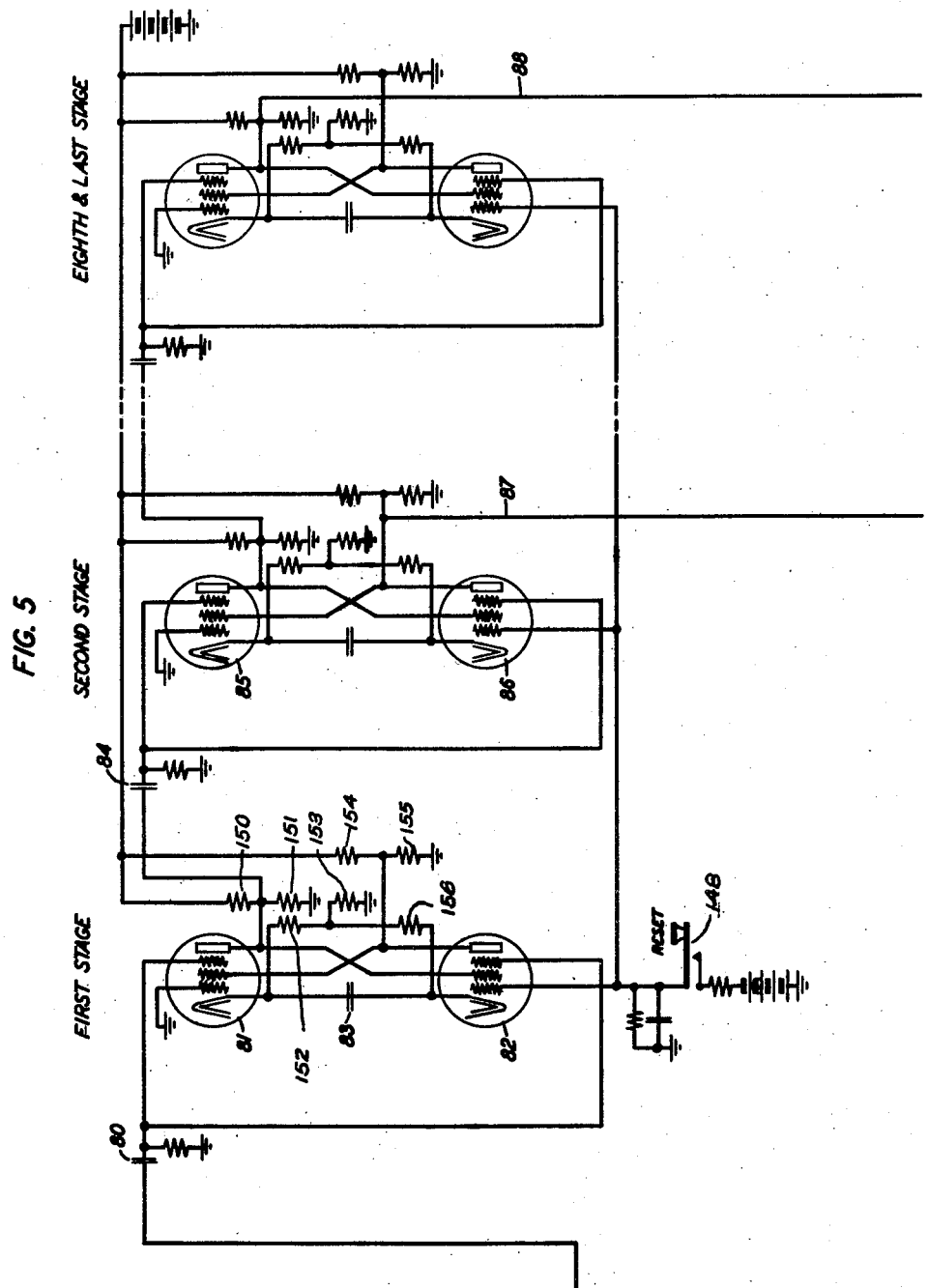

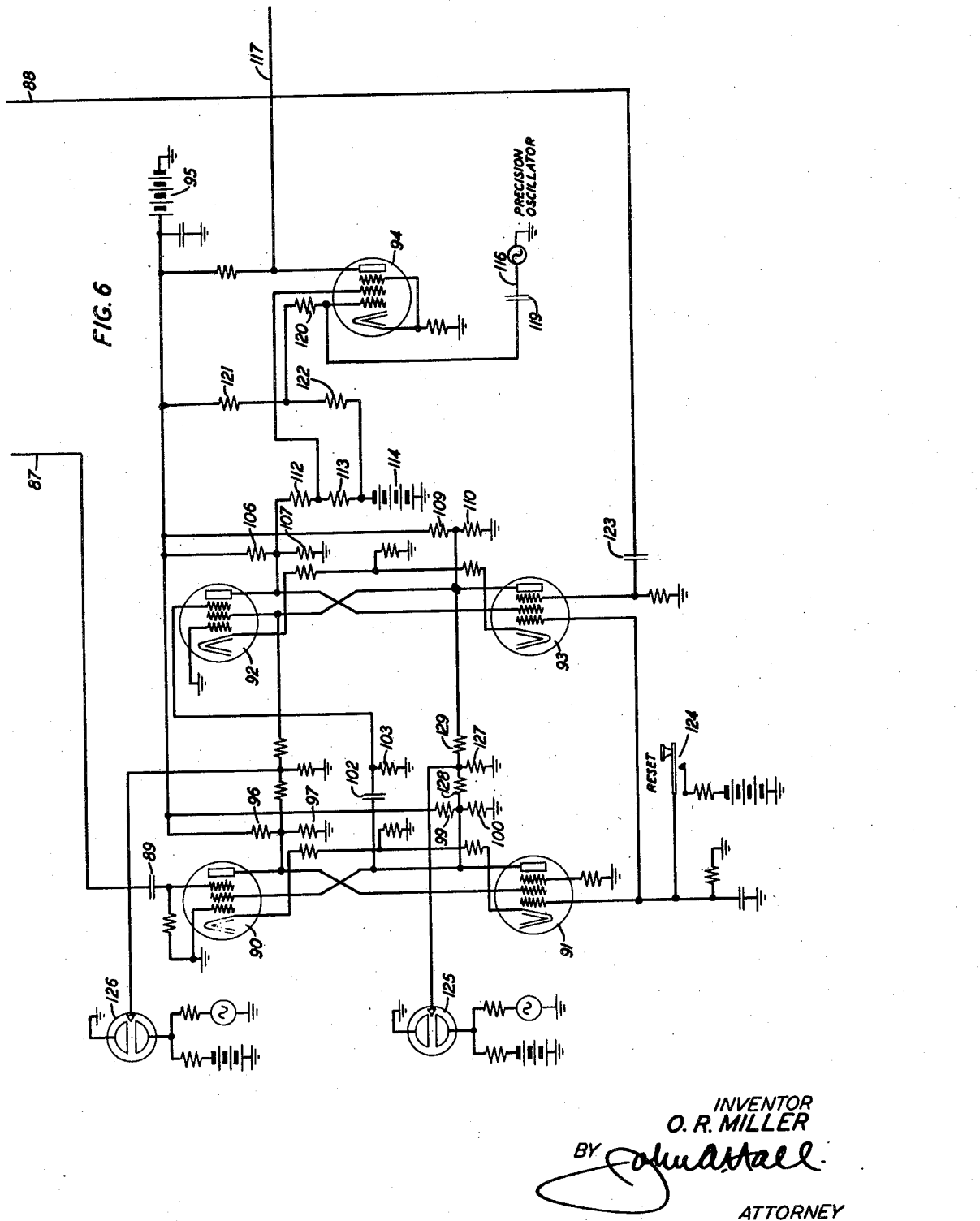

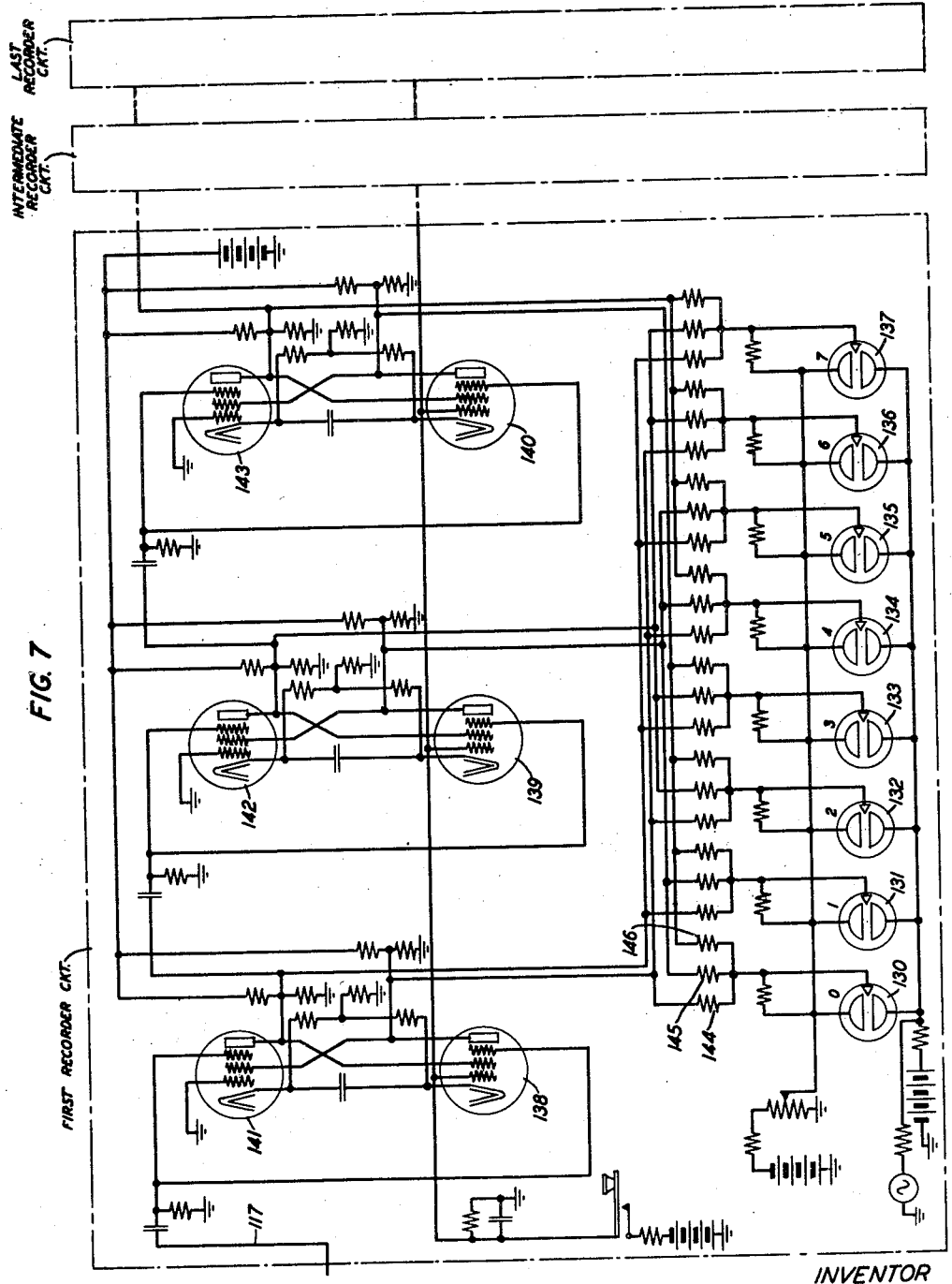

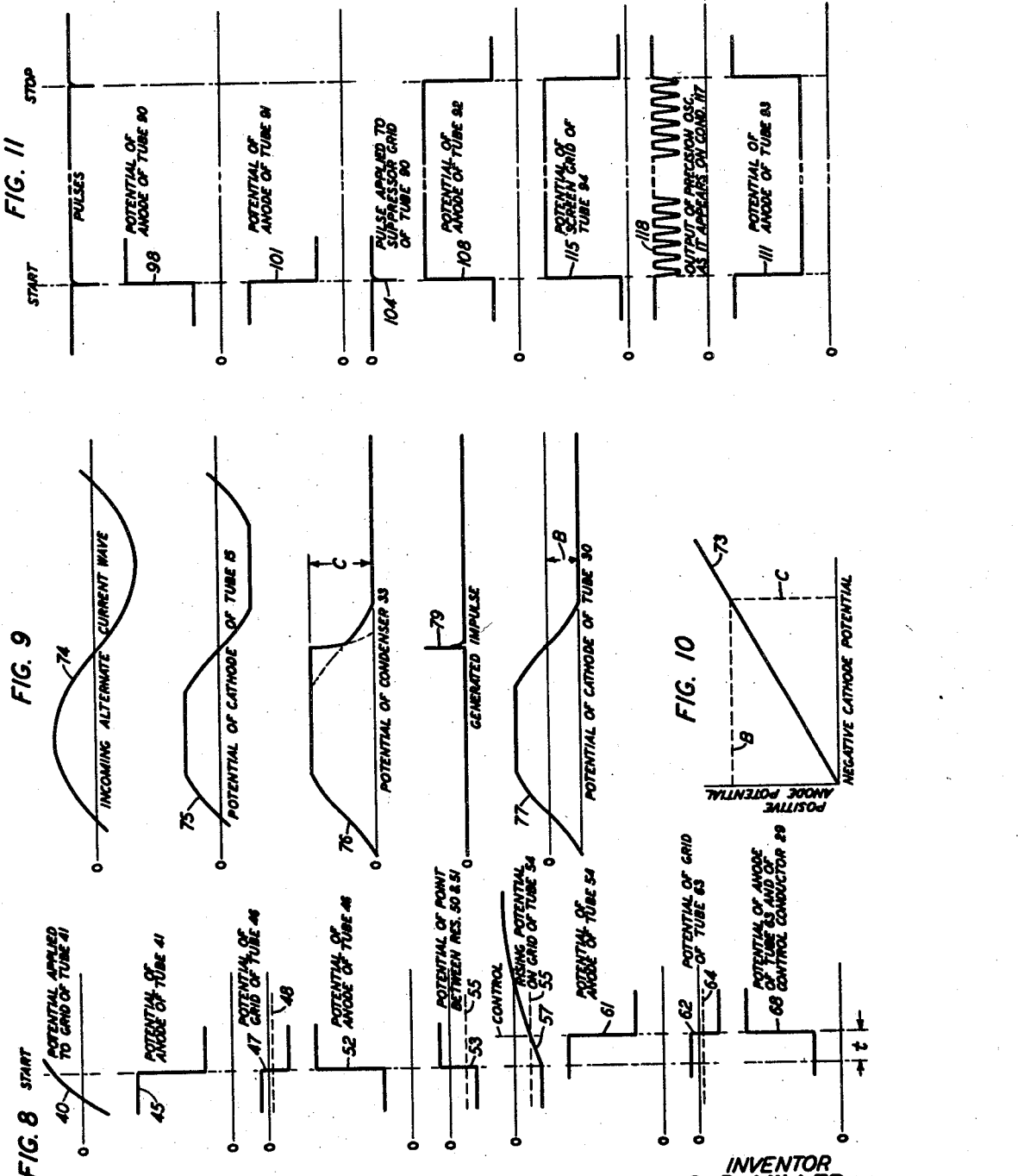

Sept. 10, 1946. O. R. MILLER 2,407,320
ELECTRONIC COUNTER
Filed Nov. 5, 1942 9 Sheets-Sheet 8

INVENTOR
O. R. MILLER
BY
ATTORNEY

Sept. 10, 1946.         O. R. MILLER         2,407,320
ELECTRONIC COUNTER
Filed Nov. 5, 1942         9 Sheets-Sheet 9

INVENTOR
O. R. MILLER
BY
ATTORNEY

Patented Sept. 10, 1946

2,407,320

UNITED STATES PATENT OFFICE 2,407,320

ELECTRONIC COUNTER

Ohmer R. Miller, Morristown, N. J., assignor to Bell Telephone Laboratories, Incorporated, New York, N. Y., a corporation of New York Application November 5, 1942, Serial No. 464,666

5 Claims. (Cl. 235—92)

This invention relates to counting means and particularly to the means for indicating the result of a counting operation.

The object of the invention is to provide means for translating a count on a binary system of counting devices into another number expressed in a lesser number of digital places and to indicate the digital value of such count.

A feature of the invention is an indicator which will give the indication of a number in a numerical system different from that used to record the number.

Another feature of the invention is an indicator which will give an indication in a numbering system using only the digits 0 to 7 of a number recorded in geometric progression on a binary system of devices.

Still another feature of the invention is an indicator which will indicate a number in accordance with the decimal system which has been recorded on a binary system of devices.

Other features will appear hereinafter.

The drawings consist of nine sheets having fourteen figures, as follows:

Fig. 1 is a schematic circuit diagram showing the relation of the various circuit units to explain the general method of operation;

Fig. 2 is a block diagram showing how Figures 3 to 7 inclusive, may be placed to make a complete detailed circuit diagram;

Fig. 3 is a circuit diagram of the impulse generator;

Fig. 4 is a circuit diagram of the time delay circuit;

Fig. 5 is a circuit diagram of a pulse counter for producing the start and stop pulses for operating the gate circuit;

Fig. 6 is a circuit diagram of the gate circuit;

Fig. 7 is a diagram of the pulse counting and recording means, showing one unit thereof in full and indicating duplicate units schematically;

Fig. 8 is a nest of graphs useful in explaining the operation of the time delay circuit of Fig. 4;

Fig. 9 is a nest of graphs useful in explaining the operation of the impulse generator of Fig. 3;

Fig. 10 is a characteristic curve of the gas tube which produces the impulses in the impulse generator of Fig. 3;

Fig. 11 is a nest of graphs useful in explaining the operation of the gate circuit of Fig. 6;

Figure 12:
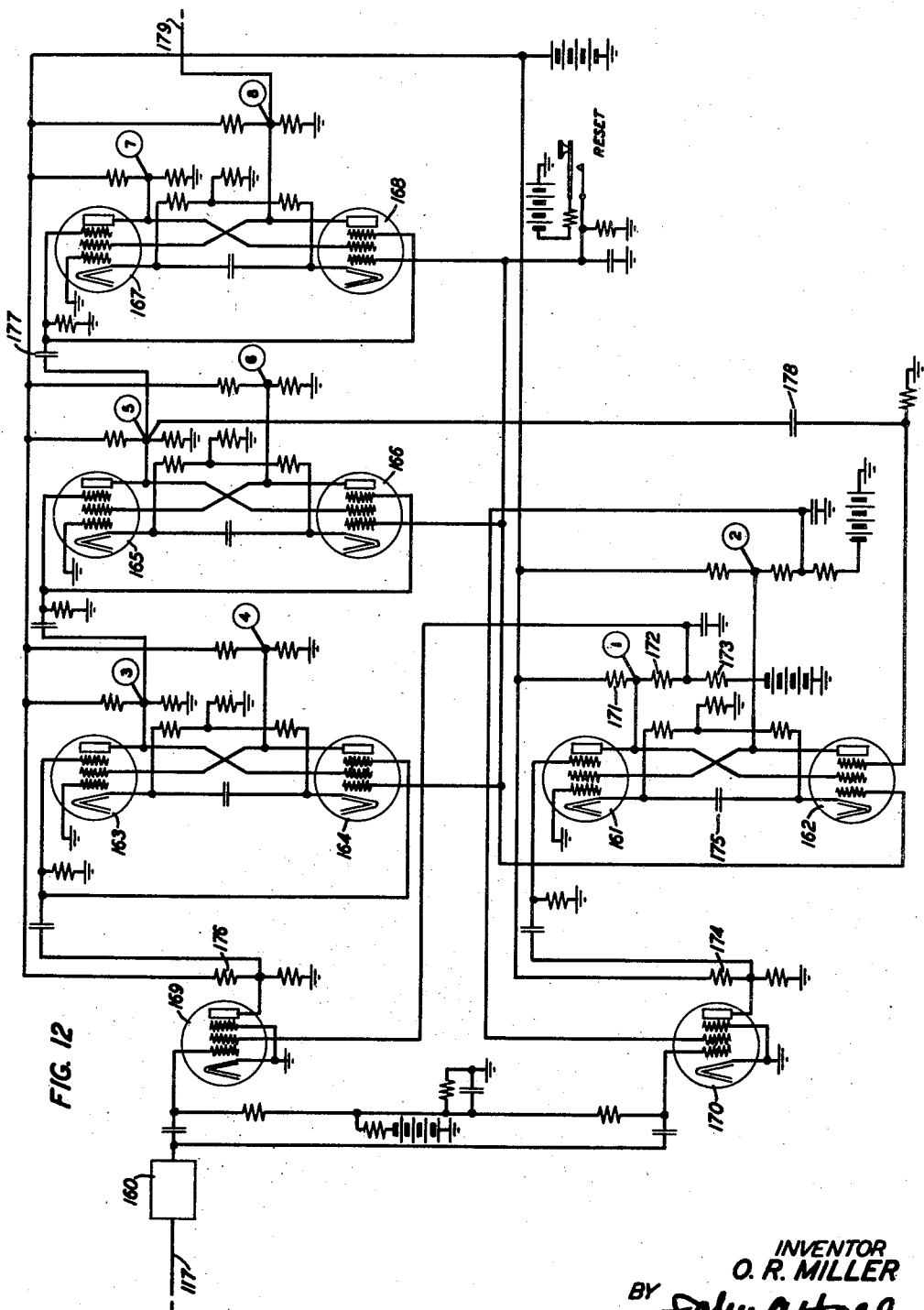
Fig. 12 is a circuit diagram of a pulse counter arranged to send out to a circuit beyond one pulse for every ten received.

In the art of counting physical phenomena where the thing to be counted may be converted or translated into a train of electrical impulses it has long been the practice to employ a pair of devices which will translate two pulses into one which may then be applied to another similar pair of devices and so on, so that with a chain of such devices in pairs any number of pulses in a chain may be counted by noting the operated state of the various devices.

For comparatively slow counting a tool well known in the communication system art as the W and Z relay combination is widely employed. This is disclosed in Patent No. 1,438,743 granted to E. H. Clark, December 12, 1922.

For high speed counting electronic devices are used. One of the earliest and best known of these is that disclosed in British Patent No. 148,582, and known as the Eccles and Jordan circuit.

Other arrangements of this nature have been devised some of which are extremely fast in operation. The circuit shown herein is one of the fastest and is known to be capable of counting physical phenomena occurring at rates measured in tens of kilocycles per second.

Since it is desired to use this arrangement to count comparatively large numbers, a large number of pairs of tubes must be used and the result of a count is gathered from an observation of the state of such large number of tubes. Since this is primarily based on a binary system of counting in which only the integers 0 and 1 are used, the result is practically unmanageable. For instance, a train of 16,383 impulses would be registered on a group of twenty-eight tubes as the number 11,111,111,111,111. A means for quickly translating such a number to its decimal equivalent is desirable. Since this can be readily done by a convenient table or by a simple arithmetical computation it then becomes of more importance to reduce the number of digital places used in making an observation. It may be noted that the following numbers all express the same number, each, however, based on a different counting system.

16,383 using integers 0 to 9 inclusive (decimal system)
24,423 using integers 0 to 8 inclusive
37,777 using integers 0 to 7 inclusive
65,523 using integers 0 to 6 inclusive
203,503 using integers 0 to 5 inclusive
1,011,013 using integers 0 to 4 inclusive
3,333,333 using integers 0 to 3 inclusive
211,110,210 using integers 0 to 2 inclusive
11,111,111,111,111 using integers 0 to 1 inclusive Thus it appears that it is no more burdensome to observe the number 37,777 based on the use of eight integers than to observe the number 16,383 based on the use of ten integers. Investigation of corresponding numbers will show, of course, that the decimal system is the only one which will express all five place numbers in five digits but the system based on the use of eight integers will not use more than six integers in any case. These observations are made to explain the fact that the binary system of counting by pairs of tubes may be arranged in such manner that a counting system based on the use of eight integers consisting of the digits 0 to 7 inclusive, is easily produced so that the observation of a large number does not become effectively more burdensome and thus subject to error than the ordinary decimal system.

Thus the counting tubes may be arranged in groups of six so that the number based on the use of the eight digits 0 to 7 inclusive, is the sum of the separate numbers indicated by the state of the different pairs of tubes. If these tubes are designated as 0 to 1 for the first pair, 0 and 2 for the second pair, and 0 and 4 for the third pair, then the sum of the designations of the operated tube of each pair will be equal to the number of pulses taken to so operate the tubes. With six such groups of tubes any five-digit number based on the decimal system may be expressed.

In accordance with this invention, the tubes forming the counting devices and which are arranged to be operated on a binary geometric progression system are observed by a network of resistance elements connected according to the desired code in permutation groups to indicating devices. If the system based on the use of eight integers hereinbefore described is to be used, then a three-place code is used and each of the digital indicators is controlled by a network of three resistance elements. From the six tubes used, three will be in operation, one in each pair, for each digital place and that one of the eight indicators which is controlled by the three resistance units connected to the three operated tubes will be activated and will give an indication.

In accordance with a variation of the invention, a larger number of tubes may be used to operate a four-place permutation code whereby digits on a decimal basis may be indicated. According to this variation, the tubes are not operated on a straight binary basis as before but are operated on a combination basis which will provide for a decimal basis of operation rather than the straight geometric progression of the binary system. Whereas, the first variation has the virtue of a minimum of apparatus, the second has the virtue of straight indication of numbers which need not be translated.

In Fig. 1 the invention is illustrated schematically. The working starts where an alternating current is fed into the impulse generator 1. As shown, this alternating current may be derived from a projectile equipped with a radio transmitter having a directional antenna in the fuse portion thereof. The radiations of such a transmitter are picked up by the radio receiver 2 in the form of oscillations periodically varying in amplitude as illustrated by the graph below the radio receiver 2. The variations in amplitude are caused by the rotation of the projectile in flight due to the rifling of known pitch of the barrel from which it has been discharged. The frequency of such variations in amplitude bear a direct relation to the velocity of such projectile in flight. The output of the radio receiver 2 is passed through a low frequency detector 3 and produces therein an alternating current all in accordance with well-known means and methods. Or the alternating current which is fed into the impulse generator 1 may be derived from any other source such, for instance, as the source of alternating current 4 and applied to the impulse generator by any means, such as the key 5.

Now, upon the application of an alternating current to the impulse generator 1, a time delay circuit 6 starts into operation and delays, for a given interval of time, the application of the output of the impulse generator to the impulse counter 7. This is to insure that the first impulses to be counted are of full strength.

The impulse generator 1 is a device which produces a single sharply defined impulse from each cycle of alternating current fed thereinto. Through novel means provided, this single sharply defined pulse may be made to occur at any particular point in the cycle over a given range as for instance, just as the wave passes through zero from the positive half wave to the negative half wave. The train of impulses now flowing into the impulse counter 7 start this device into operation with the result that two pulses are produced thereby, one constituting a start pulse at the beginning of a count, and the other constituting a stop pulse at the end of an operation during which a predetermined number of pulses are counted. Thus an interval of time A is measured between the start and stop impulses which is the time taken for a given number of rotations of the projectile or a given number of cycles of the alternating current from the source 4.

As will appear hereinafter, and for certain reasons having to do with the question of extreme accuracy, several pulses incoming to the impulse counter 7 at the beginning of the operation are absorbed and not counted.

The start and stop pulses produced by the impulse counter 7 are employed to operate the gate circuit 8. This is a device effectively interposed between a precision oscillator 9 and a recording circuit 10. The recording circuit 10 will accurately count the cycles of alternating current flowing through the gate circuit 8 during the interval A, the gate being opened by the said start impulses and being closed by the said stop impulse. Since the precision oscillator 9 may produce a current of precisely regulated frequency and of a comparatively high frequency, the interval of time A may be measured with extreme accuracy. In general, the recording circuit 10 is of the same nature as the impulse counter 7, as will be more fully set forth hereinafter.

The impulse counting circuit 10 operates as indicating circuit 11 which serves to give some kind of an indication revealing the number of impulses counted during the time A while the gate 8 was open. In accordance with one embodiment of the invention, this indicator consists of means to display a number such as 37777. The frequency of the source 9 being known, the number 37777 is then a direct measure of the time interval A and therefore in direct proportion to the velocity of the projectile or to the frequency of the source 4.

Considering now the detailed circuit drawings, several general observations may be made. Throughout the drawings, wherever ionic tubes are shown, the filaments for heating such tubes are indicated but the battery supply is not shown since the manner of making such connections is well known and the addition of such circuits would unnecessarily complicate the drawings. In various figures there are shown reset keys whose function it is to return the various circuits to their normal conditions. It will be understood that these may be in the form of separate keys as shown and described or they may all be incorporated in a single device so that at one stroke the various circuits may be properly controlled.

As explained hereinbefore in the description of the circuits of Fig. 3, an alternating current is fed into the impulse generator from one or another source such as the radio receiver 2 and low frequency detector 3 or the source 4 through some connecting agency such as the key 5. In the impulse generator, the alternating current flows in over conductor 12, through condenser 13 and thence through the primary winding of a transformer 14 to ground, it being assumed that a ground connection is provided at the said source of current. The secondary winding of transformer 14 thus becomes a source of alternating current to affect the triode 15.

The cathode grid circuit of this tube may be traced from the cathode through the resistance 16, the secondary winding of the transformer 14, resistance 17 to the grid of tube 15. A condenser 18 is in parallel with both the resistance 16 and a source of negative biasing battery comprising the resistance 19 and the well-known network of rectifiers 20, 21, 22 and 23 energized by a source of alternating current 24 and an interposed transformer 25. The potential supplied by this network is sufficient to produce a given anode-cathode current flow in the tube 15 between the battery connected to the anode thereof and the resistances 26 and 27 to ground. Under these conditions, a given potential thus stands on the cathode of tube 15, this being a point on the potentiometer consisting of the internal resistance of the tube and the two resistances 26 and 27.

Now, as an alternating current wave in the secondary winding of transformer 14 rises from a zero value to an increasing positive potential, the grid of the tube becomes less negative and as a consequence the anode-cathode current increases. Therefore, the potential of the cathode with respect to ground increases so that the potential on the start conductor 28 increases. This start conductor leads into the time delay circuit so that when the increase of potential hereon is great enough, the time delay circuit will be tripped off and in a given time will raise the potential on the control lead 29 sufficiently to allow the gas tube 30 to function.

Normally the cathode of the tube 15 is connected in a circuit with the right-hand pair of elements of the double diode tube 31, resistance 32, condenser 33, resistance 27 to ground, whereby the condenser 33 may be charged as the potential of the cathode of tube 15 rises. Normally also, the potential standing on the control conductor 29 and communicated through the left-hand pair of elements of the double diode 31 directly to the condenser 33 prevents the aforementioned charging circuit from becoming effective. In other words, the control conductor normally holds the condenser 33 down so that the impulse generator cannot function.

If the alternating current fed into the input conductor 12 is derived from the radio receiver 2, the signals may at first be weak but as they grow in strength a point will be reached where the rise of potential on the cathode of tube 15 and on start conductor 28 is sufficient to trip off the time delay circuit. Thereafter, and after a predetermined time, the potential on the control conductor 29 will be raised to enable the impulse generator to operate as will be described hereinafter.

The operation of the time delay circuit of Fig. 4 will be explained with the help of a nest of graphs shown in Fig. 8. Two vertical lines are shown, one marked "start" and the other marked "control." The distance between these lines is a measure of the time interval desired.

The start conductor 28 is connected through a resistance 34 to an intermediate point on a potentiometer comprising resistances 35, 36 and 37 connected between positive battery 38 and negative battery 39. As the potential on the conductor 28 rises according to the graph 40, it reaches a point where the gas tube 41 triggers off and this is the start of the operation. Tube 41 becomes conducting and the anode-cathode current flow therethrough changes the potential at the potentiometer point between resistances 42 and 43 as indicated by the graph 45 from a comparatively high positive potential to a comparatively low positive potential. At the same time the potential on the grid of tube 46 falls, as indicated by graph 47, from a positive value to a negative value below the cut-off bias (indicated by the dotted line 48) of the triode 46 so that this tube now becomes non-conducting. This changes the potential of the potentiometer point between the resistances 49 and 50, as indicated by graph 52, from a comparatively low positive value to a comparatively high positive value. Thereupon, the potentiometer point between resistances 50 and 51 rises, as indicated by graph 53, from a negative value through the trigger potential of gas tube 54 (indicated by the dotted line 55) to a positive value. Thereupon the condenser 147 begins to charge through resistance 56 in accordance with graph 57, and when the trigger potential 55 of the tube 54 is reached, the control conductor 29 is affected as follows. When the tube 54 becomes conducting, the potentiometer point between the resistances 58 and 59 changes its potential, as indicated by graph 61, from a comparatively high positive value to a comparatively low positive value. Thereupon the potentiometer point between resistances 59 and 60 drops, according to graph 62, from a positive value through the cut-off bias grid potential of tube 63 (indicated by the dotted line 64) to a negative value and tube 63 becomes non-conducting. This in turn changes the potential on the potentiometer point between resistances 65 and 66, as indicated by graph 68, from a comparatively low positive value to a comparatively high positive value. This last potential change is communicated over control conductor 29 to enable the impulse generator.

The tubes of Fig. 4 will now remain in the condition just described regardless of the variation in potential on the start conductor 28 until the reset keys 69 and 70 are operated to render tubes 41 and 54 again non-conducting.

A pair of signal tubes 71 and 72 are provided for visually indicating the operation of this time delay circuit. A tube suitable for this service is disclosed in Patent 2,271,685, granted to S. O. Ekstrand February 3, 1942. Tube 71, whose control anode (indicated by the arrowhead), is normally at a comparatively high positive potential, is therefore normally glowing. When this potential is dropped in accordance with graph 45, this tube becomes dark as an indication that the timing operation has started. These signal tubes are energized from a source of pulsating current, practically drawn from a source of direct current superimposed on a source of alternating current, as a simple means for extinguishing the signal when the potential on the anode is lowered since such pulsating current periodically passes through a zero or very low potential value. Tube 72 whose control anode is normally at a comparatively low positive potential is normally dark. When this potential is raised in accordance with graph 68 to a comparatively high positive potential this tube 72 glows. The period of time during which both signals are simultaneously dark is a measure of the desired time interval. This may be adjusted as desired by changing the value of the resistance 56 and the capacity of the condenser 147.

In this manner, then, the signals being fed into the impulse generator over conductor 12 grow in strength, and the impulse generator is enabled a predetermined time after such signals have reached a strength sufficient to trigger off the tube 41.

With the rise of potential on control conductor 29, the impulse generator will function. This will be explained with the help of Figures 9 and 10.

Tube 30 is a gas tube, one of whose characteristics is depicted in Fig. 10. For each given positive potential value on the anode thereof, there is a corresponding given negative value on the cathode at which the tube will fire or trigger off. This is shown by the curve 73 plotted between positive anode potentials and negative cathode potentials. In accordance with this invention, a positive anode potential is first established and thereafter the negative potential is increased (in a negative direction) until the corresponding point is reached, whereupon the tube fires.

In Fig. 9 the graph 74 represents a cycle of alternating current as delivered by the secondary of transformer 14. As the positive half wave rises in value, the negative potential on the grid of tube 15 recedes until the tube becomes saturated and hence the change of potential on the cathode thereof rises to a particular value and then halts as indicated by the graph 75. This is a measure of the potential being applied through the right-hand elements of the double diode 31 to the condenser 33. Thus the charge on condenser 33 rises, in accordance with graph 76, during the rising part of the positive half wave of alternating current potential 74. However, due to the unidirectional characteristics of the diode 31, the positive charge C attained on the condenser 33 is maintained as the falling part of the positive half wave is reached. But at this time the cathode potential of tube 30 measured at the potentiometer point between resistances 26 and 27 begins to fall, in accordance with graph 77, until the negative value B is reached. Since the positive potential C of condenser 33 is now placed through the primary winding of transformer 78 on to the anode of tube 30, this tube will fire and the condenser 33 will discharge through the anode-cathode circuit of tube 30 and the primary of transformer 78.

It is to be noted that the value of the negative bias of tube 15 may be regulated so that the value of the positive potential attained on the anode of tube 30 may be adjusted as desired. This may particularly be adjusted so that this positive potential attained or established on condenser 33 may just match the negative potential attained on the cathode of tube 30 as the alternating current wave 74 passes through zero from the positive half wave to the negative half wave. Thus the discharge of the condenser 33 may be made to occur at any desired point.

The discharge of condenser 33 through the primary of transformer 78 produces a single sharply defined pulse shown by graph 79, which may be inverted by the transformer 78 to a negative pulse. This is transmitted over the signaling conductor to the impulse counter of Fig. 5.

Thus alternating current incoming over conductor 12 is transformed into a train of sharply defined unidirectional pulses, one for each complete cycle of alternating current. These pulses are then applied to the output circuit of the impulse generator which is connected to the input circuit of the impulse counter. The pulses coming in over the input conductor pass through condenser 80 in Fig. 5 and appear as sharply defined negative pulses leading to the suppressor grids of two tubes 81 and 82.

The tubes 81 and 82 form a counting pair, one of which is always energized and in a conducting state. The principle of operation is fundamentally the same as that of the well-known Eccles and Jordan circuit, disclosed in British Patent 148,582. These tubes are, however, pentodes with the anode of each connected to the screen grid of the other. When the negative impulse is applied to the suppressor grid of both, then both are rendered non-conducting. When the said negative impulse has ceased, the combination of the two tubes is left in an extremely unstable state so that the slightest influence will determine which of the two is to become conducting to the exclusion of the other. This extremely slight influence is supplied by a condenser 83 connected between the cathodes of the two tubes which is charged in one direction while tube 81 is active, and in the other direction while tube 82 is active. When the negative impulse is applied to the two suppressor grids, condenser 83 becomes discharged but there is left a slight residual charge, the magnitude of which depends on the effective length of the said negative pulse. At the termination of this negative pulse the said slight residual charge on condenser 83 is sufficient to determine which of the two tubes will then become active. If tube 81 has been active before the negative pulse, then tube 82 will become active thereafter. Thus one negative pulse will render tube 81 inactive and tube 82 active, and a second pulse will reverse this condition and render tube 82 inactive and tube 81 active.

Throughout the circuits to be described, a large number of these counting pairs are employed, all of which operate in the same manner. The detailed description of the operation of a single pair will therefore be sufficient. It will be found that the upper tube of each pair is normally active; that is, it is in a conducting state and has a low potential on its anode. Conversely the lower tube of the pair is normally inactive; that is, it is in a non-conducting state and has a high potential on its anode.

It will be noted that the anode of each tube is in a potentiometer circuit. For tube 81 this potentiometer circuit may be traced from a high positive battery through resistance 150 and resistance 151 to ground. The anode of the tube 81 is connected to the potentiometer point between resistances 150 and 151. Also a circuit constituting a potentiometer may be traced from resistance 150, the anode-cathode path within the tube, resistance 152 and resistance 153 to ground. The resistances of the tube, 152 and 153 are thus in parallel with resistance 151. Now when the tube is non-conducting or inactive there being little if any current flow in this potentiometer circuit, the potential of the anode (and the screen grid of the companion tube) is at a comparatively high positive value. Thus the tube 82 is enabled by a comparatively high positive screen grid potential. However, when a negative potential is applied to both suppressor grids both tubes become non-conducting and hence a comparatively high positive potential is applied to the screen grid of each. Hence, when the negative potential is removed from the suppressor grids, both tubes are in a condition to become active or conducting. The choice of which one prevails rests with the condenser 83 as hereinbefore pointed out.

When tube 81 is in an active or conducting state the current flow in its anode-cathode circuit affects the potentiometer point between the resistances 150 and 151 so that the potential thereof is at a comparatively low positive value. Hence, the screen grid of the companion tube is at a comparatively low positive value and this tube is held in a non-conduction or inactive state.

The potentiometer circuit for tube 81 has been described. Tube 82 has a similar potentiometer circuit consisting of the resistances 154, 155, 156 and 153.

It has been pointed out hereinbefore that the cathode circuit of tube 81 may be traced through resistances 152 and 153 and the cathode circuit of tube 82 may be traced through resistances 156 and 153. When tube 82 is active current in its cathode circuit produces an IR drop in resistance 156 which places the cathode at a higher positive potential than the cathode of tube 81. Therefore in a normal state with tube 82 active and tube 81 inactive the condenser 83 becomes charged with a positive potential toward the active tube. As both tubes are reduced to a non-conducting state by an incoming negative impulse to their suppressor grids this difference of potential disappears and condenser 83 discharges through resistances 156 and 152. The constants of condenser 83 are such that this discharge does not become complete by the time the negative impulse to the suppressor grids of the tubes terminates so that there is still a slight residual charge on condenser 83 with the lower terminal thereof at a slightly higher positive potential. This means that the rate at which condenser 83 discharges is slower than the rate at which the anode and cathode currents of the tubes change when the potential of their suppressor grids is lowered from zero or ground potential to a negative value controlled by the incoming negative pulse. In their normal state both tubes are firmly locked into their conducting and non-conducting states, respectively but as their anode and cathode potentials move toward equalization which may be attained when their suppressor grids are simultaneously reduced to a negative potential beyond a critical value they become very unstable with the slightest influence being effective to exercise a control. Without the condenser 83 the inherent characteristics of the tubes would control and in this case one of the tubes would be dominant and the two tubes would recover from the incoming negative pulse with such dominant tube always becoming conducting. But with the slight residual charge still left on condenser 83 a trigger action takes place since this slight positive potential toward the heretofore conducting tube now takes the place of and actually overcomes the difference in the tubes with the result that the bias exerted by such slight potential causes the other tube to become slightly more conducting than that one which up to now had been conducting. The result is that at the termination of the incoming negative pulse when the tubes move toward recovery that one which has had the benefit of the negative side of the residual charge on condenser 83 and which has triggered over to the dominant state now tends to become conducting at a greater rate than the other so that as its anode potential drops accordingly the screen grid potential of the other drops also accordingly and prevents the movement of such other tube to the conducting state. As a result that tube which has the slightest advantage over the other becomes conducting. Thereafter the discharge of condenser 83 and its subsequent charge in the opposite direction is completed before another negative impulse is received on the suppressor grids to cause another reversal.

It should be noted that as a tube goes from a non-conducting to a conducting state, its potentiometer point suddenly drops from a comparatively high to a comparatively low positive value. Hence as tube 81 becomes active the potentiometer point between resistances 150 and 151 drops and condenser 84 translates this sudden drop in potential into a negative impulse to be applied to the suppressor grids of tubes 85 and 86.

Thus the pair of tubes 81 and 82 provide a means which sets up a stable condition which will remain fixed, but which instantly responds to a negative incoming pulse to reverse the previous condition of the two tubes. Also the tubes in their reversal will generate a like negative pulse when the reversal in condition is in a given direction so that for every two incoming negative pulses, a single outgoing negative pulse is generated.

The impulse counter consists of a plurality of pairs arranged to count the impulses according to a binary geometric progression system. Thus, the first pulse renders tube 82 active. The second pulse rendering tube 81 again active will also generate a negative pulse through condenser 84 to the pair of tubes 85 and 86 and will result in rendering tubes 82 and 85 inactive and tubes 81 and 86 active. The third pulse will render tube 81 inactive and tube 82 active.

It may be noted that if each of the lower tubes of all pairs is given a value of zero and the upper tubes given a value according to a geometric progression as 1, 2, 4, 8, 16, 32, 64, 128, 256, etc., that the sum of the values of the inactive tubes will be a count of the number of pulses. Thus, at the beginning, all the inactive tubes will have a value of zero and the sum of such values will be zero. After the first pulse, tube 81 will be inactive and the sum now becomes 1. After the second pulse tube 85 is inactive and tube 81 is active so that the sum becomes 2. After the third pulse tubes 81 and 85 are inactive so that the sum becomes 1+2=3. With two pair of tubes, three pulses may be counted as the next or fourth pulse will return both pair of tubes to normal while passing such fourth pulse on the next pair of tubes to be counted there. With eight stages two hundred and fifty-five pulses may be counted, all pairs being returned to normal on the two hundred and fifty-sixth pulse with such pulse being passed on to the following pair or stage.

Thus in the impulse counter of Fig. 5, eight stages of these counting pairs of tubes are provided. The first pulse renders tube 81 inactive; the second pulse renders tube 85 inactive and tube 86 active. As tube 86 passes from the inactive to the active stage, a negative pulse is generated and passed over conductor 87 where it functions as a start signal to the gate circuit of Fig. 6. The two hundred and fifty-sixth pulse returns all the upper inactive tubes to normal and generates a negative pulse which now passes over conductor 88 where it functions as a stop signal to the gate circuit. Thus the difference between two hundred and fifty-six and two or two hundred and fifty-four pulses is counted, the first two being effectively absorbed. The gate circuit thus opens a circuit for the flow of alternating current from a precision oscillator for the length of time between two hundred and fifty-four pulses from the impulse generator. The impulse counter may be arranged to count any other number which would be more suitable under the circumstances under which this apparatus may be used.

The purpose of absorbing one or more pulses at the beginning of the train is to insure the measurement of a definite time interval and avoid error which might come from a false start if the first impulse transmitted from the impulse generator were not of full strength.

The reset key 148, when operated, will return the impulse counter to normal by rendering all the lower tubes of the various stages inactive.

The action of the gate circuit, Fig. 6, will be explained with the help of a set of graphs, Fig. 11. Here a number of tubes are employed some of which are paired as in the pulse counter. For instance, tubes 90 and 91 form one pair and tubes 92 and 93 form another pair. Tubes 90 and 92 are normally active and tubes 91, 93 and 94 are normally inactive. The connections of the tubes are much as before except that the condenser between the cathodes of the tubes of a pair is not employed so that a negative pulse coming in over the start conductor 87 and passing through the condenser 89 will reverse the condition of the tubes 90 and 91, rendering tube 90 inactive and the tube 91 active. Thereafter this pair of tubes remains in this condition until released by the reset key 124. Since tube 91 is active after the start pulse has come in over conductor 87 the screen grid of tube 90 is at a low positive potential which any positive pulse coming in over conductor 87 cannot overcome. A potentiometer is formed between the positive battery 95, resistance 96 and resistance 97 to ground, and the anode of tube 90 and the grid of tube 91 are connected to this potentiometer at a point between resistances 96 and 97. Due to the current flow while tube 90 is active, the potential of this point is held at a comparatively low positive value. When the negative start pulse comes in over conductor 87 to the suppressor grid of tube 90, this tube becomes non-conducting with the consequence that the potential of the anode in the said potentiometer circuit rises to a comparatively high positive value, as indicated by graph 98 (Fig. 11). Since this comparatively high positive potential also appears on the screen grid of tube 91, this latter tube now becomes conducting. Here again a potentiometer is formed of positive battery 95, resistance 99 and resistance 100 to ground. The potential on the potentiometer point between resistances 99 and 100 is normally a comparatively high positive potential but as tube 91 becomes conducting this drops to a comparatively low positive potential as indicated by graph 101. This being communicated to the screen grid of tube 90 holds this tube non-conducting after the termination of the negative start pulse.

As the potential of the anode of tube 91 drops, the condenser 102 responds by discharging between resistances 103 and 100, forming a negative pulse, graph 104, applied to the suppressor grid of tube 92. Tube 92, normally conducting, now becomes non-conducting with the result that the potentiometer point between resistances 106 and 107 rises from a comparatively low positive value to a comparatively high positive value, as indicated by graph 108. This causes tube 93 to become conducting so that the potential on the potentiometer point between resistances 109 and 110 now drops from a comparatively high positive value to a comparatively low positive value, as indicated by graph 111. This drop of potential communicated to the screen grid of tube 92 holds this tube non-conducting after the termination of the negative impulse from condenser 102.

Another potentiometer is formed between positive battery 95, resistances 106, 112 and 113 to negative battery 114. The potential of the point between resistances 112 and 113 in general follows the potential of the point between resistances 106 and 107, as indicated by graph 115, and hence as this point rises in potential, the tube 94 is rendered active so that pulses from the precision oscillator connected to input lead 116 may be passed through the tube 94 to the output lead 117 as a train of negative pulses, as indicated by the graph 118.

The output of the precision oscillator is practically a sine wave. It is, however, connected through a condenser 119 and a resistance 120 to a potentiometer point between resistance 121 leading to positive battery and resistance 122 leading to negative battery, whereby the tube 94 is biased to cut-off so that only the peaks of the positive half waves affect the tube to produce at its anode and on conductor 117 a series of negative pulses. Before the start pulse has rendered the tube 92 non-conducting, the screen grid of tube 94 is held down to a comparatively low positive potential (graph 115) so that the tube 94 is blocked. When upon the occurrence of the start pulse the potential of this screen grid rises to a comparatively high positive potential, this tube becomes unblocked and the distorted wave from the precision oscillator passes to the output 117 as a train of negative pulses. The conditions thus far described hold until the stop pulse is received over conductor 88.

When the stop pulse is transmitted over conductor 88, it passes through condenser 123 and appears as a negative pulse on the suppressor grid of tube 93, whereupon the condition of the two tubes 92 and 93 will become reversed, 92 becoming conducting and 93 becoming non-conducting. It will be seen from graphs 108, 111, 115 and 118 that the flow of negative pulses over the output circuit 117 is thus abruptly terminated.

The circuit will remain in the present condition, with tubes 91 and 92 active and tubes 90, 93 and 94 inactive until the circuit is returned to normal condition by the operation of the reset key 124, which, by temporarily placing negative potential on the control grids of tubes 91 and 93 insures that tubes 90 and 92 become active and tubes 91, 93 and 94 become inactive.

As in the case of the time delay circuit described hereinbefore, this circuit unit is provided with a pair of glow tubes to indicate the condition of the apparatus. Tube 125 is normally active, and becomes dark as soon as the start pulse is received and remains dark thereafter. Tube 126 is normally dark and remains dark until the stop pulse is received whereupon it glows. The interval during which both tubes are dark is therefore a measure of the time interval between the start and stop pulses.

The control electrode of tube 125, indicated by the arrowhead, is connected to a potentiometer point leading through resistance 127 to ground. The potential of this point is controlled by tube 91 over resistance 128 and by tube 93 over resistance 129. When either of these tubes is active, the tube 125 is held inactive but when both these tubes 91 and 93 are inactive, as under normal conditions, then the potential of the point between resistances 99 and 100 and the potential of the point between resistances 109 and 110 is at a comparatively high positive value and tube 125 as a consequence glows.

Likewise, tube 126 is under control of tubes 90 and 93 so that only after the gate circuit has completely functioned and tubes 90 and 93 are simultaneously inactive, is tube 126 conditioned to glow. Thus tube 125 glowing indicates that the gate circuit has not yet functioned and tube 126 glowing indicates that the gate circuit has completely functioned.

The train of negative pulses transmitted over conductor 117 feed into a chain of pulse counters similar to those shown in Fig. 5. In order to count a number of pulses of the order of 16000 it would be necessary to provide about fifteen pair of tubes. As pointed out hereinbefore, with fourteen pair of tubes and after a counting operation in which the upper or normally conducting tube of each pair has been rendered non-conducting, a number 11,111,111,111,111 in accordance with the simple binary geometric progression scheme of counting would be recorded. This number, translated into the commonly used decimal system, would mean that a train of 16383 pulses had been counted. However, since the first of these numbers is awkward to handle, the arrangement shown in Fig. 7 may be employed. Here a set of fifteen pair of tubes is employed, arranged in five sets of three pair each. Each such set of tubes represents the means for recording a single "digit" in a system using the digits 0 to 7 inclusive, so that 16383 pulses counted would be recorded as the number 37777.

As hereinbefore pointed out, if the three lower tubes 138, 139 and 140 are given the value zero each and the three upper tubes 141, 142 and 143 are given the value 1, 2 and 4 respectively, then the "digit" recorded on this unit will be equal to the sum of the values of the three tubes which are simultaneously inactive. A group of eight glow tubes 130 to 137 inclusive, similar in construction and operation to the tubes 71 and 72, Fig. 4, is used to indicate the number recorded on this unit having the values 0 to 7 inclusive, respectively. Thus, if the three lower tubes 138, 139 and 140 are all inactive as in normal condition, the glow tube 130 will be active and by glowing will indicate the "digit" zero. If, on the other hand, all three upper tubes 141, 142 and 143 are inactive, then glow tube 137 by glowing will indicate that the "digit" 7 (equal to the sum of 1+2+4) has been recorded.

The tube 130, by way of example, is a glow discharge tube having a control electrode indicated by an arrowhead. Only when the potential of this control electrode is at a comparatively high positive potential will current flow between the anode and cathode thereof. This condition will obtain when tubes 138, 139 and 140 are simultaneously inactive (as in the normal state when the count is zero) as at such a time the anodes of these tubes are each at a comparatively high positive potential. If on the other hand when any one or more of the tubes 138, 139 and 140 is active (so that its anode is at a comparatively low positive potential) the resultant potential of the control electrode of tube 130 will be insufficient to trigger off this tube. It will also be noted that the anode cathode circuit includes a source of alternating current which makes the anode cathode current pulsating and this connection insures that as soon as the potential of the control electrode falls the tube will be quenched since at some place in the following cycle of alternating potential the pulsating anode cathode current will reach a minimum at which the tube will no longer conduct without the aid of a sufficiently high control electrode potential.

It will be noted that each glow tube, such as the tube 130, is connected to a network having a resistance leading to one tube of each pair. Thus resistance 144 is connected to the anode of tube 138, resistance 145 is connected to the anode of tube 139 and resistance 146 is connected to the anode of tube 140. It is only when these three tubes 138, 139 and 140 are simultaneously inactive that the potential of the control electrode of glow tube 130 is sufficiently high to render the tube 130 active. From the above it will readily be seen that these tubes are connected in a network based on a permutation code whereby only one of the glow tubes 130 to 136 is rendered active at any one time.

The arrangement of the six tubes 138 to 143 inclusive, may be considered as recording and indicating means for the last "digit" in a system based on the use of digits 0 to 7, inclusive. Other digital recorders are indicated by the broken line rectangles to the right. All of the various pairs of tubes are arranged serially so that if the upper tube of each pair were given a value according to the simple binary geometric progression 1, 2, 4, 8, 16, 32, 64, 128, 256, 512, 1024, 2048, 4096, 8192, 16384 and the upper tube of the first fourteen pairs were inactive, then the sum of such values would be the sum of the first fourteen members of the above progression, or 16383, but the number indicated on the glow tubes would be the corresponding number 37,777.

It is recognized that an indicator which would give a direct reading in the decimal system is desirable; hence the arrangement of Fig. 12 is found to be useful even though a larger number of counting tubes must be employed.

In the arrangement of Fig. 12 a ten pulse counter is shown in full and other similar counters are indicated whereby a number of pulses may be counted on a decimal basis. This counter is arranged to be operated by positive pulses so that the negative pulses coming in over conductor 117 will have to be inverted by some well-known means such as a tube or a transformer which is herein indicated by the rectangle 160. There are ten tubes 161 to 170, inclusive, provided of which five, namely 161, 163, 165, 167 and 170 are normally active.

Tube 161 being normally active holds the potential of the potentiometer point between resistances 171 and 172 to a comparatively low positive potential. Likewise the potentiometer point between resistances 172 and 173 which is connected to the screen grid of tube 169 is held down to the point where tube 169 is blocked and will not transmit the incoming pulses. Tube 170, however, will invert the incoming positive pulse into a negative pulse since the rise in cathode-anode current flowing through resistance 174 causes a drop in the potential of the anode. Hence a positive pulse incoming to tube 170 appears on the suppressor grid of tube 161 as a negative pulse. The pair of tubes 161 and 162 are similar to the counting tubes heretofore described except that the incoming negative pulse is applied only to the suppressor grid of tube 161. Tube 161 is therefore rendered inactive and hence under control of condenser 175 the condition of tubes 161 and 162 is reversed, 161 now being inactive and tube 162 becoming active.

The first of the ten incoming pulses thus reverses the condition of tubes 161 and 162 and by raising the potential of the point between resistances 172 and 173 renders the tube 169 responsive to following impulses. At the same time a similar potentiometer point controlled by tube 162 falls in potential and renders tube 170 unresponsive to following impulses.

The second impulse controlling tube 169 and due to the resistance 176 now is inverted into a negative pulse to the suppressor grid of tubes 163 and 164 so that the condition of the tubes 163 and 164 is reversed, tube 164 becoming active and tube 163 becoming inactive.

The third impulse again reverses the condition of the tubes 163 and 164, rendering tube 163 active and tube 164 inactive and at the same time affects the next pair of tubes 165 and 166 rendering tube 165 inactive and tube 166 active.

The fourth impulse now reverses the condition of tubes 163 and 164, rendering tube 163 inactive and tube 164 active.

The fifth pulse reverses the condition of both pairs 163 and 164 and 165 and 166 rendering tubes 163 and 165 active and tubes 164 and 165 inactive. At the same time a negative impulse is applied through condenser 177 to the suppressor grid of tube 167 and through condenser 178 to the suppressor grid of tube 162. Thus the fifth impulse reverses the condition of tubes 167 and 168 rendering tube 167 inactive and tube 168 active. The negative impulse applied to the suppressor grid of tube 162 will reverse the condition of tubes 161 and 162, tube 161 being rendered active and tube 162 being rendered inactive. Tubes 169 and 170 are also reversed, tube 169 being rendered inactive and tube 170 being rendered active.

The sixth impulse will reverse the condition of tubes 161 and 162, rendering tube 161 inactive and tube 162 active. Tube 169 is now rendered active and tube 170 inactive as before.

The seventh impulse reverses the condition of tubes 163 and 164, rendering tube 163 inactive and tube 164 active.

The eighth impulse reverses the condition of the pair 163 and 164 and the pair 165 and 166, rendering tubes 163 and 166 active and tubes 164 and 165 inactive.

The ninth pulse reverses the condition of the pair 163 and 164, rendering tube 163 inactive and tube 164 active. It will now be found that all the tubes are the reverse of normal, that is, tubes 162, 164, 166, 168 and 169 are now active and tubes 161, 163, 165, 167 and 170 are inactive.

The tenth pulse results in a change back to normal. Here, as in the fifth pulse, a negative pulse is transmitted to tube 162 so that the condition of the pair of tubes 161 and 162 is reversed.

On this tenth pulse as tube 168 becomes inactive its anode changes from a comparatively low positive potential to a comparatively high positive potential. This sudden rise in potential appears on the outgoing conductor 179 and thus constitutes a positive pulse to the next set of tubes. If a plurality of sets of tubes of this nature are used, the first will serve to register the units digit of a number, and the succeeding sets will serve to register the tens, hundreds, thousands, and so on digits for as many places as may be desired.

Figure 13:
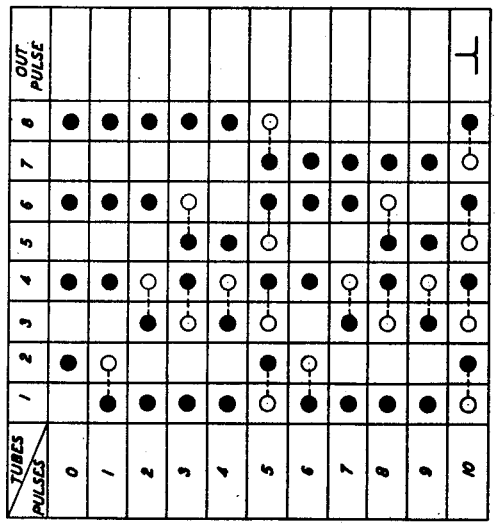
Fig. 13 is a chart to show the sequence of operation of the counting tubes of the ten pulse counter of Fig. 12.

The above-described action of the tubes may be visualized by the help of the chart, Fig. 13. In this chart the tubes are numbered one to eight, inclusive, to correspond to the numbers in the circles connected to the potentiometer points for the various tubes. Where a solid black dot appears in the chart it represents a comparatively high positive potential on such potentiometer point. In some cases there will be an outlined dot and then a dotted line to a solid dot to indicate that the result of the pulse was to render the tube with the outlined dot active (comparatively low positive anode potential) and the other inactive (comparatively high positive anode potential). Thus pulse number one results in the reversal of the condition of tubes 1 and 2 (tubes 161 and 162, respectively).

The chart of Fig. 13 thus depicts the permutation code whereby ten various combinations of the conditions of tubes 161 to 168, inclusive, may be used to record the ten digits. Fig. 13 also depicts the out pulse transmitted on the tenth pulse (the zero pulse for the tens recorder) in the form of a graph.

Figure 14:
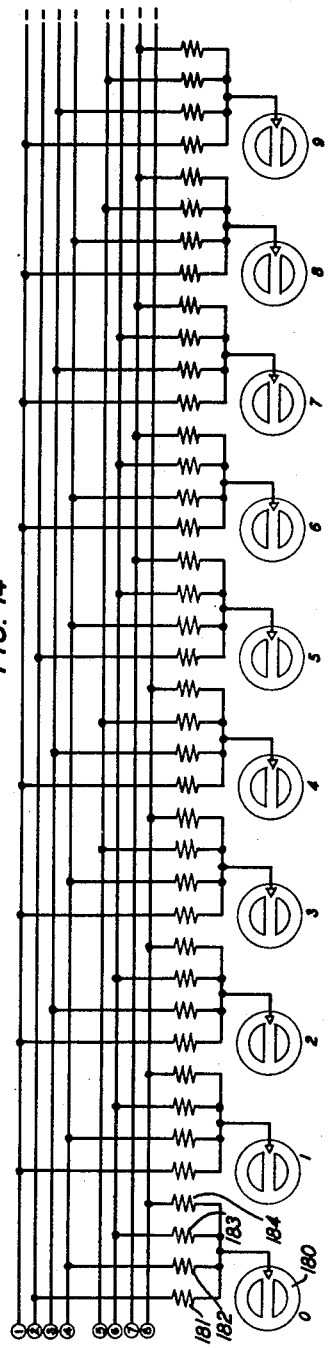
Fig. 14 is a circuit diagram of a decimal bank of indicating tubes which may be operated by the ten pulse counter.

Fig. 14 represents a network of resistances similar in principle to the network shown in the lower part of Fig. 7 whereby a set of ten glow lamps may be operated to display the digit which may have been registered at any time on the device of Fig. 12. In this figure there are eight lines each terminating in a circle in which a number is inscribed. These correspond to similar legends in Fig. 12 and are intended to indicate that these lines are connected to the corresponding potentiometer points. Thus the glow tube 180 is connected through a network of four resistances 181, 182, 183 and 184 leading to the potentiometer points of tubes 162, 164, 166 and 168, respectively, so that when these tubes are simultaneously inactive and their anodes are all at a comparatively high positive potential the resultant potential applied to the control electrode of the glow tube 180 is sufficiently high to cause this tube to glow. By the same token the corresponding resultant potential for each of the remaining nine glow tubes is lowered beyond the operating point for such glow tube.

In this manner a train of a large number of impulses serially related may be counted on a device in accordance with the commonly used decimal system, the number finally being displayed being that of the total number counted.

APPENDIX

By way of example, the following lists of values and types of resistances, capacities, voltages and tubes are given. It should be noted that other values may be used and it is quite possible that further experiment might prove that improvement in operation could be secured through deviation from the values and types given.

Resistors

| | | | |
|---|---|---|---|
| 16 | 5,000ω | 100 | 1Ω |
| 17 | 5,000ω | 103 | .1Ω |
| 26 | 9,000ω | 106 | 125,000ω |
| 27 | 5,000ω | 107 | 1Ω |
| 32 | 5,000ω | 109 | 125,000ω |
| 34 | .25Ω | 110 | 1Ω |
| 35 | .5Ω | 112 | .5Ω |
| 36 | 0-100,000ω | 113 | 2Ω |
| 37 | 150,000ω | 120 | 50,000ω |
| 42 | 100,000ω | 121 | 100,000ω |
| 43 | .5Ω | 122 | 50,000ω |
| 44 | .5Ω | 127 | 5Ω |
| 49 | 30,000ω | 128 | 5Ω |
| 50 | 150,000ω | 129 | 5Ω |
| 51 | 100,000ω | 150 | 125,000ω |
| 56 | 0-1Ω | 151 | 1Ω |
| 58 | 100,000ω | 152 | 820ω |
| 59 | .5Ω | 153 | 1,500ω |
| 60 | .5Ω | 154 | 125,000ω |
| 65 | 50,000ω | 155 | 1Ω |
| 66 | .25Ω | 156 | 820ω |
| 67 | .6Ω | 172 | .5Ω |
| 96 | 125,000ω | 173 | 2Ω |
| 97 | 1Ω | 174 | 125,000ω |
| 99 | 125,000ω | 176 | 125,000ω |

Condensers 13 1 mf.
18 50 mf.
33 .002 mf.
Condenser associated with grid of tube 41—20 mmf.
55 .5 mf.
80 50 mmf.
83 .03 mf.
84 50 mmf.
89 50 mmf.
102 125 mmf.
119 .1 mf.
175 .03 mf.
177 50 mmf.
178 50 mmf.

Voltages

24—110 volts 60 cycle alternating current
Alternating current source to indicating lamps 71 and 72—110 volts 60 cycle alternating current
38—+255 volts
39——150 volts
Fig. 5—direct current for anode potentiometers—+255 volts
Fig 5—direct current for reset key 148— —150 volts
Fig. 6—95—+255 volts
Fig. 6—direct current for indicating lamps 125 and 126— —130 volts
Fig. 6—direct current for reset key 124— —150 volts
Fig. 6—114— —150 volts
Fig. 7—direct current for anode potentiometers—+255 volts
Fig. 7—direct current for reset key— —150 volts
Fig. 7—direct current for upper cathode of indicating lamps— —150 volts
Fig. 7—direct current for lower cathode of indicating lamps— +140 volts
Fig. 7—alternating current for lower cathode of indicating lamps—110 volts 60 cycle alternating current
Fig. 12—direct current for anode potentiometers —+255 volts
Fig. 12—negative direct current sources— —150 volts

Tubes

| | | | |
|---|---|---|---|
| 15—6J5 | | 138—6SJ7 |
| 30—884 | | 139—6SJ7 |
| 31—6H6 | | 140—6SJ7 |
| 41—884 | | 141—6SJ7 |
| 46—1/26F8 | | 142—6SJ7 |
| 54—884 | | 143—6SJ7 |
| 63—1/26F8 | | 161—6SJ7 |
| 81—6SJ7 | | 162—6SJ7 |
| 82—6SJ7 | | 163—6SJ7 |
| 85—6SJ7 | | 164—6SJ7 |
| 86—6SJ7 | | 165—6SJ7 |
| 90—6SJ7 | | 166—6SJ7 |
| 91—6SJ7 | | 167—6SJ7 |
| 92—6SJ7 | | 168—6SJ7 |
| 93—6SJ7 | | 169—6SJ7 |
| 94—6SJ7 | | 170—6SJ7 |

What is claimed is:

1. An indicating device for receiving a number in the form of a train of serially related electrical pulses and indicating the number so received in a numbering system based on the use of more than two integers, comprising a plurality of pairs of mutually controlling electronic tubes, each said pair of tubes being responsive to a pulse to render the at the time conducting tube non-conducting and the at the time non-conducting tube conducting, said plurality of pairs of tubes being serially related whereby the incoming pulses are registered according to a binary geometric progression system, a group of indicators, said group corresponding in number to the number of integers used in said numbering system, a network of resistance elements for said group of indicators connected according to a permutation code between said electronic tubes and the indicators of the said group and a source of energizing current for said indicators, each said indicator being responsive to the resultant electrical condition transmitted thereto through said network of resistance elements only when all electronic tubes connected thereto through said network are non-conducting.

2. A number counter comprising a cascaded plurality of pairs of counting tubes responsive to incoming impulses in accordance with a binary geometric progression, and means for translating the response thereof into indications on the decimal system, comprising an auxiliary pair of counting tubes also responsive to said incoming impulses for dividing the response of said first plurality of pairs of counting tubes into a plurality of operations, a plurality of indicators, a network of resistance elements connected according to a permutation code between said cascaded and said auxiliary counting tubes and said indicators and a source of energizing current for said indicators, each said indicator being responsive to the resultant electrical condition transmitted thereto through said network of resistance elements only when all counting tubes connected thereto through said network are in a predetermined operative condition.

3. A number counter comprising a cascaded plurality of pairs of counting tubes responsive to incoming impulses in accordance with a binary geometric progression and means for translating the response thereof into indications on the decimal system comprising an auxiliary pair of counting tubes responsive in part directly to said incoming impulses and in part indirectly through an intermediate pair of said first plurality of pairs of counting tubes to said incoming impulses for dividing the response of said first plurality of pairs of counting tubes into a plurality of operations, and a plurality of indicators connected in accordance with a permutation code to said cascaded and said auxiliary counting tubes for indicating the ten digits of the decimal system in accordance with the number of incoming impulses received by said counting tubes.

4. A number counter comprising a cascaded plurality of pairs of counting tubes responsive to incoming impulses in accordance with a binary geometric progression and means for translating the response thereof into indications on the decimal system comprising an auxiliary pair of counting tubes responsive to certain equally spaced incoming impulses of a train of such impulses for switching said first plurality of pairs of counting tubes into circuit to receive the remaining impulses of said train, and a plurality of indicators connected in accordance with a permutation code to said cascaded and said auxiliary counting tubes for indicating the ten digits of the decimal system in accordance with the number of incoming impulses received by said counting tubes.

5. A number counter comprising a cascaded plurality of pairs of counting tubes responsive to incoming impulses in accordance with a binary geometric progression and means for translating the response thereof into indications on the decimal system comprising an auxiliary pair of counting tubes responsive to certain equally spaced incoming impulses of a train of such impulses, a pair of gate tubes responsive to said auxiliary pair of counting tubes for controlling the admission of said impulses of said train alternatively to said first plurality of pairs of counting tubes and said auxiliary pair of counting tubes, and a plurality of indicators connected in accordance with a permutation code to said cascaded and said auxiliary counting tubes for indicating the ten digits of the decimal system in accordance with the number of incoming impulses received by said counting tubes.

OHMER R. MILLER.